United States Patent [19]

Horowitz et al.

[11] 4,281,483

[45] Aug. 4, 1981

[54] METHOD OF CURVING SUPPORTING SURFACES OF DRIVING BELT ELEMENTS

[75] Inventors: Alexandre Horowitz, Eindhoven; Rudolf J. G. A. van der Hoorn, Nuenen; Jozef W. M. Kummeling, Leende, all of Netherlands

[73] Assignee: Volvo Car B.V., Helmond, Netherlands

[21] Appl. No.: 7,470

[22] Filed: Jan. 26, 1979

[30] Foreign Application Priority Data

Jan. 31, 1978 [NL] Netherlands .......................... 7801101

[51] Int. Cl.³ .......................... B24B 1/00; B24B 21/16
[52] U.S. Cl. .................................. 51/328; 51/281 R; 51/DIG. 14; 51/395
[58] Field of Search ..................... 51/135 R, 137, 141, 51/281 R, 328, DIG. 14, 394, 395; 29/557

[56] References Cited

U.S. PATENT DOCUMENTS

| 994,358 | 6/1911 | Wysong | 51/141 |
| 1,656,016 | 1/1928 | Reeves . | |
| 1,853,516 | 4/1932 | Erickson | 51/135 |
| 2,170,925 | 8/1939 | Kellenberger . | |
| 3,496,679 | 2/1970 | Dunn | 51/135 R X |
| 3,885,359 | 5/1975 | Reekes | 51/328 |

FOREIGN PATENT DOCUMENTS 7511879  4/1977  Netherlands .

Primary Examiner—Gary L. Smith
Attorney, Agent, or Firm—Haseltine and Lake

[57] ABSTRACT

A method of providing transverse elements to be arranged in a consecutive series side by side on a driving belt with curved surfaces by which they support the driving belt. The surfaces obtain a curvature by replacing the driving belt by an endless grinding band having grinding material on its inner side engaging the said surfaces and running the whole on two pulleys, one of which has a smaller diameter than the other one. The grinding band has longitudinal zones with different abrasing capacities, for example by providing the band with a longitudinal range of gaps in its middle zone. In this way the supporting surfaces obtain simultaneously a curvature in the running direction of the belt and in a direction opposite thereto.

10 Claims, 6 Drawing Figures

METHOD OF CURVING SUPPORTING SURFACES OF DRIVING BELT ELEMENTS

BACKGROUND OF THE INVENTION

The invention relates to a method of providing transverse elements to be arranged in a consecutive series on a driving belt with curved surfaces by which they support the driving belt as also to the transverse elements thus obtained and to the driving belt provided therewith.

Transverse elements of this type are known from German Pat. No. 2,643,528 and, moreover, it is known per se to give the running surfaces for driving belts a curving at right angles to the running direction of the driving belt as a measure against the risk of the belt running off the pulley.

It is an object of the invention to meet inconveniences which occur particularly in the application of a consecutive range of transverse elements on a carrying driving belt, by shaping a specially shaped supporting surface for the driving belt on the transverse elements. It is another object of the invention in its elaboration to manufacture such a specially shaped curving surface in a simple manner.

The advantages to be obtained with the invention include a restriction of the strain on the material of the driving belt in comparison with known embodiments and, as a result thereof, an improvement of the efficiency, for instance in the case of application in transmissions, and a longer life.

SUMMARY OF THE INVENTION

According to the present invention the said supporting surfaces obtain a curvature by replacing the driving belt by an endless grinding band having grinding material on its inner side engaging the said surfaces and running the whole on two pulleys, one of which has a smaller diameter than the other one. The grinding band has longitudinal zones with different abrasing capacities, for example by providing the band with a longitudinal range of gaps in its middle zone. In this way the supporting surfaces obtain simultaneously a curvature in the running direction of the belt and in a direction opposite thereto.

In this way wedge-shaped oil supply slots may be shaped between a running driving belt in its definite composition and the curved surfaces of each of the transverse elements.

Thanks to a low loss of energy in driving belt transmissions, wherein the present invention is applied, a low temperature can be maintained therein during active operation.

Preferred embodiments of the present invention are specially directed to the obtainment of the desired curving with a very great precision and to enable the manufacture of the transverse elements in their original shape very cheap, especially by simplification of finishing steps after stamping from sheet metal.

DESCRIPTION OF A PREFERRED EMBODIMENT

Metal plates such as designated by 1 and 2, are arranged as the transverse elements on a multilayered endless driving belt 3 along the whole length thereof in mutual engagement. Each transverse element has two belt supporting surfaces located symmetrically with respect to each other, one on each side of a symmetry-line one of those surfaces being designated by 4. The driving belt is made up of two parallel belts 3 which are tailed sideways in recesses 6 of the transverse plates.

Figure 1:
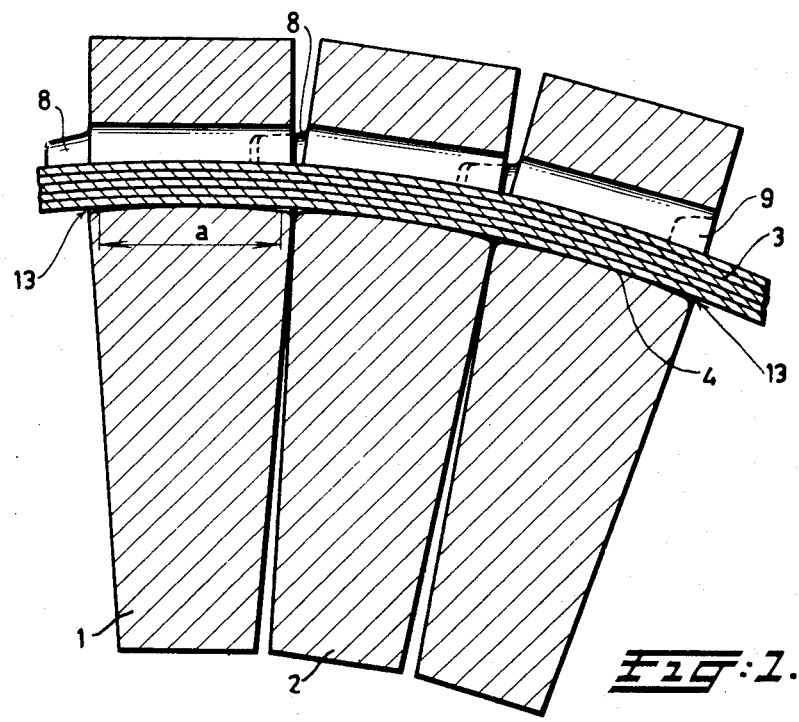
FIG. 1 is a cross section in the longitudinal direction of a driving belt along the line I—I in FIG. 3, comprising three metal transverse elements according to the invention, the thickness of the transverse elements being shown on an exaggerated scale.
Figure 4:
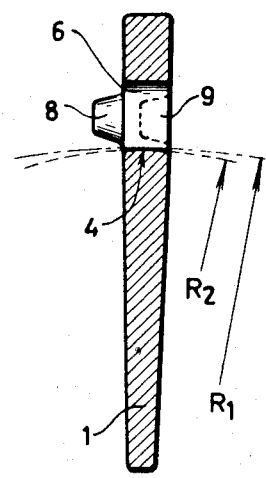
FIG. 4 is a cross section of a transverse element in which the actual proportions of the dimensions are more approached than in FIG. 1.

Such a construction is applied particularly for so-called V-belts in transmissions in which the V-belt is guided between pairs of conical running disks. The beveled sides 7 of the transverse plates will then rest against the surface of the running disks. In order to allow the belt to run through the curved portions of its track even with a smaller radius than that of the curve shown in FIG. 1, the cross section of the transverse elements is beveled at least on one side of the plates downwardly from near the level of the neutral line of the belt as shown in FIGS. 1 and 4. The dotted line 10 in FIG. 2 indicates a level where the front sides of the plates 7 may engage each other in a curve of the belt.

Furthermore each of the elements is provided on one side in its middle part on level with the slots 6 with a cam 8 and on the other side with a recess 9. The cam 8 and the recess 9 form engaging coupling portions which prevent mutual lateral displacement of the transverse elements and, as a result thereof, turning of these elements around an axis at right angles to the carrying belt 3 and they also limit overturning around an axis parallel to the surface of the driving belt, at right angles to the abovementioned axis.

In actual practice, the plates 1 and 2 are mostly so thin that the cam 8 may be formed by material of the plate which is pressed outwardly on one side of the plate when a corresponding recess 9 is pressed inwardly on the other side. A said turning around an axis at right angles to the belt would include a sideward shifting of the plates and as this shifting is prevented by the coupling 8, 9 the turning is also prevented. The phenomenon occurs exactly with thin plates and not when the thickness of the transverse element with respect to the height of the portion which contacts the conical disks laterally, is as large as with the use of block-shaped transverse elements.

Figure 3:
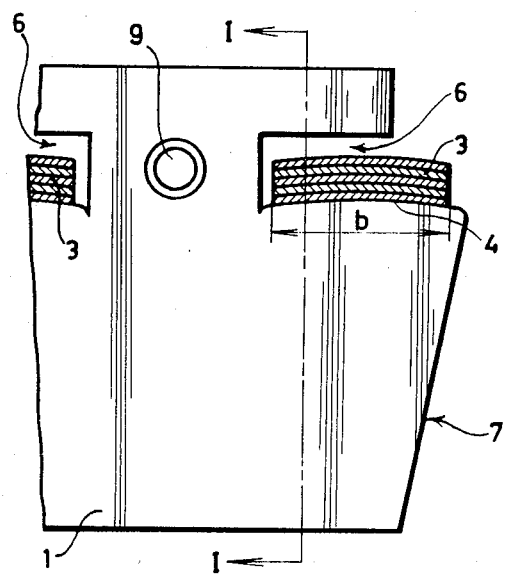
FIG. 3 is a detail front view of FIG. 1 on a smaller scale
Figure 2:
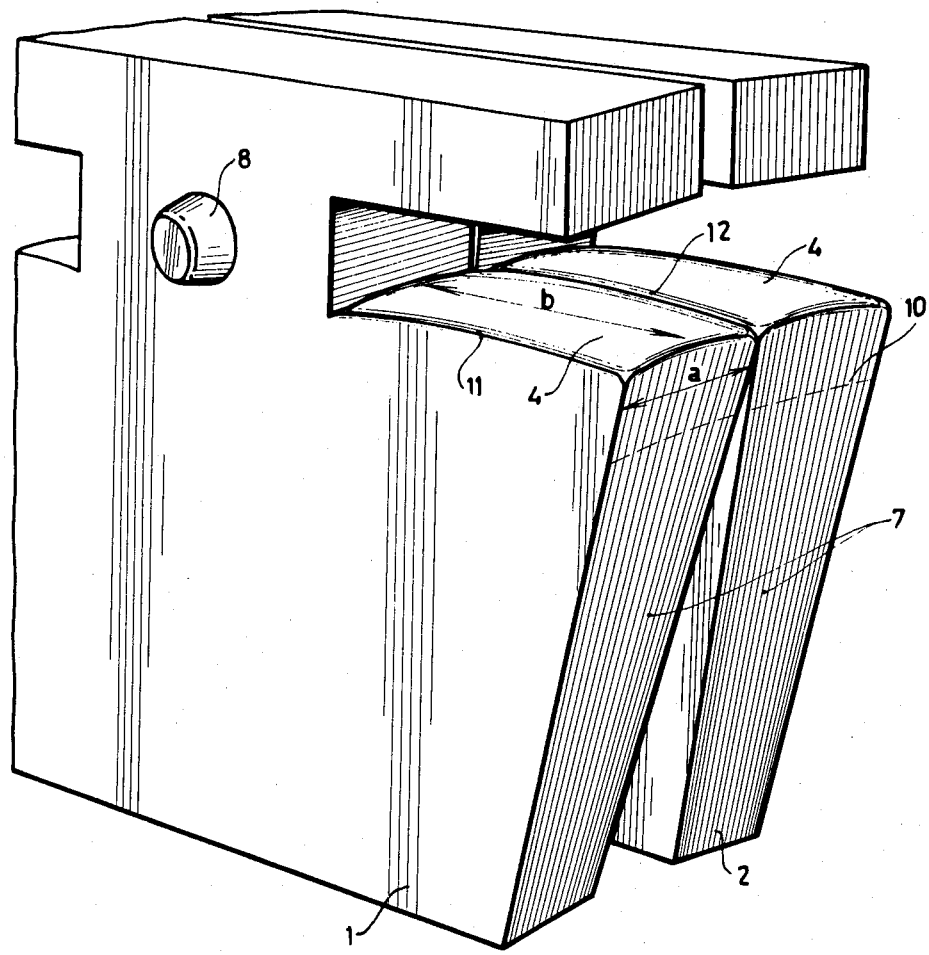
FIG. 2 is a perspective view of two of the said transverse elements (not shown in full)

As can be seen from FIG. 2 the supporting surface 4 for the driving belt 3 shows a curvature in the direction indicated by a in FIGS. 1 and 2 as also a curvature in the direction indicated by b in FIGS. 3 and 2.

The curve in the direction a has a curvage radius (R2 in FIG. 4.) being smaller than the smallest curvage radius (R1 in FIG. 4) which the driving belt will assume between the conical pulleys when in operation. This means that the belt 3, when operating, has practically no engagement with the running surface near the sides of the transverse element 1 indicated by 11 and 12 in FIG. 2. While the greater part of the supporting surface 4 continues bearing, at the sides thereof small wedge-shaped slots, as indicated by 13 in FIG. 1 into which oil may enter, will be left open. Due to this shape of the curvature it is also obtained that no disturbing deformation remains at these edges as may arise when stamping the plates.

For a driving belt with a smallest running radius of, for instance 36 mm, a curvage radius of about 25 mm may be chosen to advantage for the curvature in the direction a, generally to be a curvature radius of about ⅔ of the smallest running radius prescribed for the driving belt.

It is now of great importance that a method has been found of making both curvatures in the mutually vertical directions a and b in a simple manner and that this can be done for a large number of transverse elements in one operation at the same time. This will be explained with reference to FIGS. 5 and 6.

Figure 5:
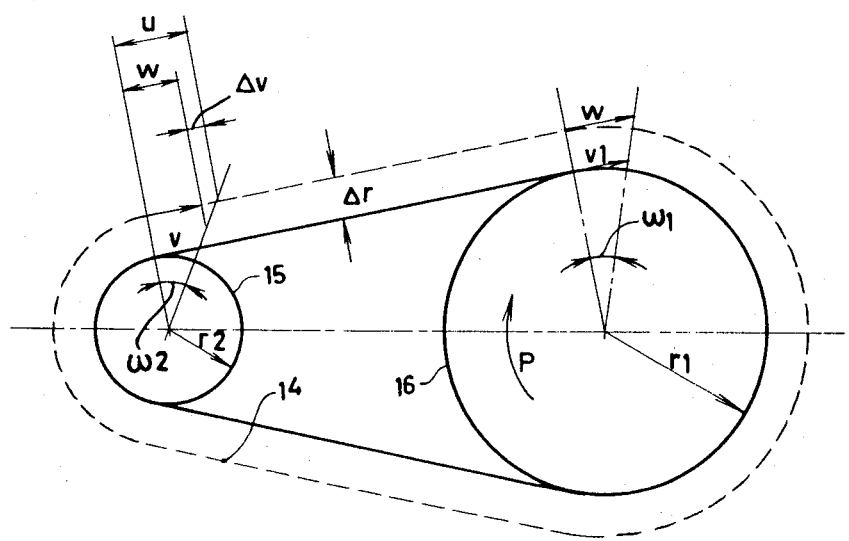
FIG. 5 is a schematic picture of an apparatus for the purpose of illustrating the manner in which the method according to the invention is carried out.

After the transverse plates, such as 1 and 2, have been stamped out, they are arranged side by side against each other on two grinding bands, designated by a dotted line 14 in FIG. 5. The grinding bands take the same position as the bands 3 in FIGS. 1 and 3, their inner surface being a grinding surface. The belt 14 thus formed is guided on rolls 15 and 16 (or between pairs of conical pulleys). When for instance, roll 16 is driven in the direction of arrow P, the grinding causing the desired double curving of the supporting surfaces 4 is reached. This may be seen from the following analysis with reference to FIG. 5.

At an angular displacement $\omega_1$ for roll 16 (radius $r_1$), that for roll 15 (radius $r_2$) may be obtained from $\omega_1/\omega_2 = r_2/r_1$. The linear displacement at the circumference is $v = \omega_1 r_1 = \omega_2 r_2$. With a thickness $\Delta r$ of the packet of transverse plates roll 16 applying a velocity of $w = \omega_1(r_1 + \Delta r)$ to this belt, while for roll 15 (see FIG. 5) velocity $u = \omega_2(r_2 + \Delta r)$ is applicable. Due to the fact that the velocity w does not agree with the velocity u of the supporting surface of the transverse plates around roll 15, there arises a relative difference of velocity $\Delta v$ between those plates and the grinding bands resting on their supporting surfaces 4. This difference of velocity is utilized for the grinding operation. If for the radius of roll 16 the diameter of 25 mm already mentioned is chosen, it is evident that for a driving belt having a smallest curvature radius of 36 mm, there arises a curvature 9 in the direction a with a curve which always deviates as at 13 in FIG. 1 from the curve assumed by the driving belt with advantages thereof as already discussed.

Figure 6:
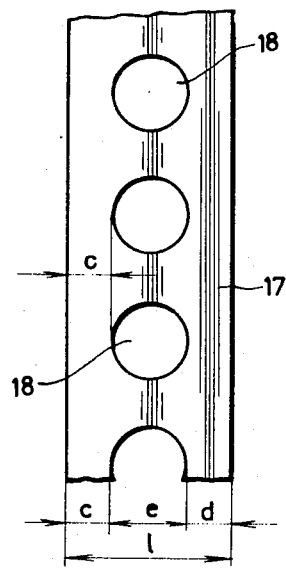
FIG. 6 is a top view of a part of a treatment band as may be applied in the apparatus of FIG. 5.

At the same time, however, a curvature b should be shaped in a direction at right angles to the direction a and this is obtained in that the grinding belts in the zones indicated by c and d in FIG. 6, have a higher material-removing capacity than in the middle portion e.

Of course, this may be achieved by providing the strips c and d of the grinding belts with a surface layer of a higher grinding capacity than in the middle strip e, but FIG. 6 shows a still simpler possibility in which belt 17 may be provided with grinding material which has an even grinding capacity on the whole surface, but in which the grinding action in the middle of the grinding belt is diminished by making holes 18 in the belt.

Furthermore, in certain instances, a grinding belt on which the grinding material is evenly divided along the whole width will suffice because if sufficient tensile stress is applied to the grinding belt, the side strips thereof are found to remove more material from the grinded surface than the middle strip. Further the plates may be stamped with a curvature of the supporting surfaces in the direction b with a stronger curve than the curve finally to be arrived at. Then the grinding material of the grinding band may be evenly divided on its surface because in the middle portion of the surface it will remove more material than at the sides. A similar result may be obtained by stamping the plates with a smaller curve in the direction b than that to be obtained finally, in which case a grinding belt with even distribution of grinding material will remove more material at the sides than in the middle portion.

In connection with slight deviations which may occur in the position of the transverse elements with respect to the belt, the material-removing operation by the grinding band is preferably carried out consecutively in two mutually opposite running directions of the latter with respect to the surface to be curved.

In connection with the power with which the grinding belt has to be spanned, preferably use is made of hoop steel provided with a layer of soft copper in which hard grinding particles, such as diamond boart, are taken up.

What is claimed is:

1. A method of making curved supporting surfaces on a consecutive range of transverse elements to be arranged on a driving belt, comprising the steps of curving by one operation both in the running direction of the belt and in a direction at right angles thereto; said curvings are made simultaneously on a ring of transverse elements arranged side by side as a circular row, guiding a grinding band across the joint supporting surfaces on the transverse elements to be curved, forming the radius of curvature of the curve in the running direction of the belt defined by the diameter of the circular row of elements, producing the curving at right angles thereto simultaneously for providing the grinding band with a higher material-removing capacity on the outer sides than in the middle portion and producing continuous curving which is the same for all plates.

2. A method as defined in claim 1, and dividing the grinding band into longitudinal zones with mutually different material-removing capacity.

3. A method as defined in claim 2, and providing the grinding band with one or more ranges of apertures in longitudinal direction of the belt, for causing the material-removing active surface in the scope of such range to be reduced.

4. The method of claim 1, and providing transverse elements near the level of the supporting surfaces of the element, on the one hand, with a projecting coupling element and, on the other hand, with a recess for receiving such a coupling element arranging the transverse elements during the grinding operation side by side against each other as a circular ring, the coupling elements engaging between each pair of adjoining transverse elements.

5. The method of claim 1 and executing the grinding by means of an endless grinding band having a grinding surface on its inner side and supported by the same supporting surface of the transverse element surfaces as are used for the final driving belt, guiding the whole in a transmission arrangement on run disks in a transmission proportion in which the running diameter between the smallest pair of disks is smaller than that which is prescribed as the smallest operating running diameter for the definitive driving belt.

6. The method of claim 1, and stamping the transverse elements from sheet metal with a larger or smaller curving of the supporting surfaces in the running direction of the belt, than the curving to be made definitively whilst the latter is then obtained, in the first case, by removing more material in the middle of the curving than at the sides and, in the second case, inversely.

7. The method of claim 1, and applying a polishing band for a micro-polishing operation for finishing the operation of shaping the curved supporting surfaces.

8. The method of claim 1, and applying a grinding belt of resilient material, such as steel, the grinding powder being embedded on a surface layer of softer material, such as copper.

9. A method as defined in claim 1, and arranging the radius of the supporting surfaces of the transverse elements in a ring during the finishing by about ⅔ of the smallest running radius prescribed for the driving belt for which the transverse elements are intended.

10. The method of claim 1 and carrying out the material-removing operation by the grinding band consecutively in two mutually contrary running directions.

* * * * *